(12) United States Patent
Dhanasekaran et al.

(10) Patent No.: US 10,803,093 B2
(45) Date of Patent: Oct. 13, 2020

(54) SYSTEMS AND METHODS FOR ENABLING A FILE MANAGEMENT LABEL TO PERSIST ON A DATA FILE

(71) Applicant: MICROSOFT TECHNOLOGY LICENSING, LLC, Redmond, WA (US)

(72) Inventors: Kannan Dhanasekaran, Redmond, WA (US); Nakul Garg, Sammamish, MA (US); Krishna Kumar Parthasarathy, Redmond, WA (US); Dheepak Ramaswamy, Seattle, WA (US); Yu Li, Bellevue, WA (US); Martin Gagne, Woodinville, WA (US); Yonghua Yang, Sammamish, WA (US); Jinhao Li, Redmond, WA (US); Liming Chen, Redmond, WA (US); Mingquan Xue, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 15/852,241

(22) Filed: Dec. 22, 2017

(65) Prior Publication Data

US 2019/0095511 A1 Mar. 28, 2019

Related U.S. Application Data

(60) Provisional application No. 62/562,121, filed on Sep. 22, 2017.

(51) Int. Cl.
*G06F 16/28* (2019.01)
*G06F 16/25* (2019.01)
(Continued)

(52) U.S. Cl.
CPC .......... *G06F 16/285* (2019.01); *G06F 16/164* (2019.01); *G06F 16/168* (2019.01);
(Continued)

(58) Field of Classification Search
CPC ...... G06F 16/285; G06F 16/164; G06F 16/25; G06F 16/168; G06F 40/117; G06F 16/907
(Continued)

(56) References Cited

U.S. PATENT DOCUMENTS 5,953,419 A 9/1999 Lohstroh et al.
9,619,665 B2 4/2017 Ko
(Continued)

FOREIGN PATENT DOCUMENTS

EP 2237144 A1 10/2010

OTHER PUBLICATIONS

Papagiannis, et al., "CloudFilter: Practical Control of Sensitive Data Propagation to the Cloud", In Proceedings of ACM Workshop on Cloud computing security workshop, Oct. 19, 2012, 6 Pages.
(Continued)

*Primary Examiner* — Evan Aspinwall
(74) *Attorney, Agent, or Firm* — Newport IP, LLC; Mike R. Cicero (57) ABSTRACT

Techniques for labeling data files that enable a file management label to persist on a data file. Variations disclosed herein enable a file management label to be embedded within a data file so that the file management label propagates with the data file when the data file is copied and/or moved between systems and/or workloads. In some embodiments, an application may be configured to write the file management label directly into a stream of the data file. For example, an application client that is run locally on a client device may open the data file by accessing its corresponding
(Continued)

stream. While the data file is open within the application client such that a user may edit content of the data file, the application client may be caused to associate the file management label with the data file. Ultimately, the application client may write this association directly into the stream.

20 Claims, 6 Drawing Sheets

(51) Int. Cl.
 *G06F 16/16* (2019.01)
 *G06F 40/117* (2020.01)
 *G06F 16/907* (2019.01)
(52) U.S. Cl.
 CPC ............ *G06F 16/25* (2019.01); *G06F 40/117* (2020.01); *G06F 16/907* (2019.01)
(58) Field of Classification Search
 USPC .......................................................... 707/705
 See application file for complete search history.

(56) References Cited

U.S. PATENT DOCUMENTS

| | | | |
|---|---|---|---|
| 9,646,010 B2 | 5/2017 | Mokhtarzada et al. | |
| 2004/0133544 A1* | 7/2004 | Kiessig | G06F 16/10 |
| 2006/0085735 A1 | 4/2006 | Shimizu | |
| 2006/0248129 A1 | 11/2006 | Carnes et al. | |
| 2006/0259468 A1* | 11/2006 | Brooks | H04L 51/34 |
| 2007/0016771 A1 | 1/2007 | Allison et al. | |
| 2007/0094312 A1* | 4/2007 | Sim-Tang | G06F 16/125 |
| 2007/0203937 A1* | 8/2007 | Prahlad | G06F 16/24575 |
| 2008/0195664 A1* | 8/2008 | Maharajh | H04W 4/06 |
| 2012/0323925 A1* | 12/2012 | Fitzsimmons | G06F 16/48 707/741 |
| 2013/0160072 A1* | 6/2013 | Reus | G06F 21/604 726/1 |
| 2013/0198474 A1* | 8/2013 | Shaath | G06F 12/1466 711/163 |
| 2015/0350806 A1* | 12/2015 | Britton | H04W 4/60 455/411 |
| 2016/0026827 A1* | 1/2016 | Ko | G06F 21/6209 713/193 |
| 2016/0078048 A1 | 3/2016 | Balakrishnan | |
| 2016/0315892 A1* | 10/2016 | Mutha | H04L 51/08 |
| 2017/0193848 A1* | 7/2017 | Bonney-Ache | H04L 67/306 |
| 2018/0027006 A1* | 1/2018 | Zimmermann | H04L 63/0245 726/11 |
| 2018/0225177 A1* | 8/2018 | Bhagi | G06F 16/21 |

OTHER PUBLICATIONS

Pash, Adam, "Advanced file and attachment management with Gmail", Retreived From: <<https://lifehacker.com/274567/advanced-file-and-attachment-management-with-gmail>>, Jul. 3, 2007, 11 Pages.

* cited by examiner

SYSTEMS AND METHODS FOR ENABLING A FILE MANAGEMENT LABEL TO PERSIST ON A DATA FILE

PRIORITY APPLICATION

This application claims the benefit of and priority to U.S. Provisional Application No. 62/562,121, filed Sep. 22, 2017, the entire contents of which are incorporated herein by reference.

BACKGROUND

Records management systems enable organizations to define and enforce file management policies for retaining data files for regulatory compliance purposes and/or purging data files for risk management purposes. For instance, an organization may develop a file management policy to abide by government regulations requiring certain financial documents to be retained for a minimum retention period. File management labels may be generated and associated with individual data files to inform records management systems and/or organization personnel that the individual data files are subject to particular file management policies.

Conventional records management systems generate and maintain databases to keep track of associations between individual file management labels and individual data files. For example, in response to a user tagging a particular data file with a particular file management label, a records management system will typically update a database to reflect the association defined by the user. Unfortunately, conventional records management systems are ill-suited to maintain associations between data files and file management labels when individual data files propagate between systems and/or workloads. For instance, suppose that an individual data file is stored within an organization's file sharing platform and has also been duly labeled using a conventional records management system. Under these circumstances, when this individual data file propagates from the organization's file sharing platform to some other location (e.g., due to being downloaded to a USB "thumb-drive," forwarded in an email, downloaded to local drive on a client device, etc.), any previously made association between this individual data file and one or more file management labels is unfortunately lost.

It is with respect to these and other considerations that the disclosure made herein is presented.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter or number of a sequence of letters or numbers to refer to each individual item. Generic references to the items may use the specific reference number without the sequence of letters.

FIG. 2 further illustrates an exemplary dataflow scenario in which the file management label persists on the data file even after the data file is widely propagated through various computing devices.

DETAILED DESCRIPTION

The following Detailed Description describes techniques for labeling data files that provides benefits over conventional records management systems by, for example, enabling a file management label to persist on a data file. Generally described, variations disclosed herein enable a file management label to be embedded within a data file so that the file management label propagates with the data file when the data file is copied and/or moved between systems and/or workloads. In some embodiments, an application may be configured to write the file management label directly into a data stream (referred to hereinafter as "Stream") of the data file such as, for example, a FileStream of the "System.IO" data stream class. For example, an application client (e.g., a Word Processing Application such as MICROSOFT WORD) that is run locally on a client device (e.g., a laptop PC) may open the data file by accessing its corresponding stream. While the data file is open within the application client such that a user may edit content of the data file (e.g., written text of the data file, editable charts of the data file, etc.), the application client may be caused to associate the file management label with the data file. Ultimately, the application client may write this association directly into the stream (e.g. during a save operation in which any changes made to the data file via the application client are saved to a hard drive).

Conventional records management techniques generally enable labels to be associated with data files within one or more databases that are external to the data files. Accordingly, these techniques enable the maintenance of such associations within only those systems which correspond to (e.g., have access to) the one or more databases. When a data file is moved and/or copied from a first system that corresponds to the one or more databases to a second system (e.g., a personal computer, a USB "thumb-drive," a third-party mail server, etc.) that is unassociated with the one or more databases, any file management label(s) associated with the data file in the one or more databases does not travel with the data file to the second system. In essence, moving and/or copying the data file from the first system to the second system causes a new instance of the data file to be created on the second system but without any indication that any file management label(s) are applicable to the data file. In practical terms, however, the presently disclosed techniques for labeling data files causes a file management label to become an integral part of a data file so that the file management label propagates with the data file regardless of a presence and/or absence of any corresponding records management system and/or database.

To illustrate aspects of the techniques disclosed herein: FIGS. 1-7 illustrate various data flow scenarios and other aspects of systems and graphical user interfaces (GUIs) that enable a file management label to persist on a data file even after the data file is propagated from a first system to a second system and so on. Similar to other illustrations described herein, it can be appreciated that operations and/or functionalities may be described according to a logical flow of data between various components. The order in which these operations and/or functionalities are described and/or illustrated herein is not intended to be construed as a limitation. Rather, any number of the operations and/or functionalities described with respect to any one of FIGS. 1-7, may be combined in any order and/or in parallel in accordance with the present disclosure. Other processes and/or operations and/or functionalities described throughout this disclosure shall be interpreted accordingly.

Figure 1:
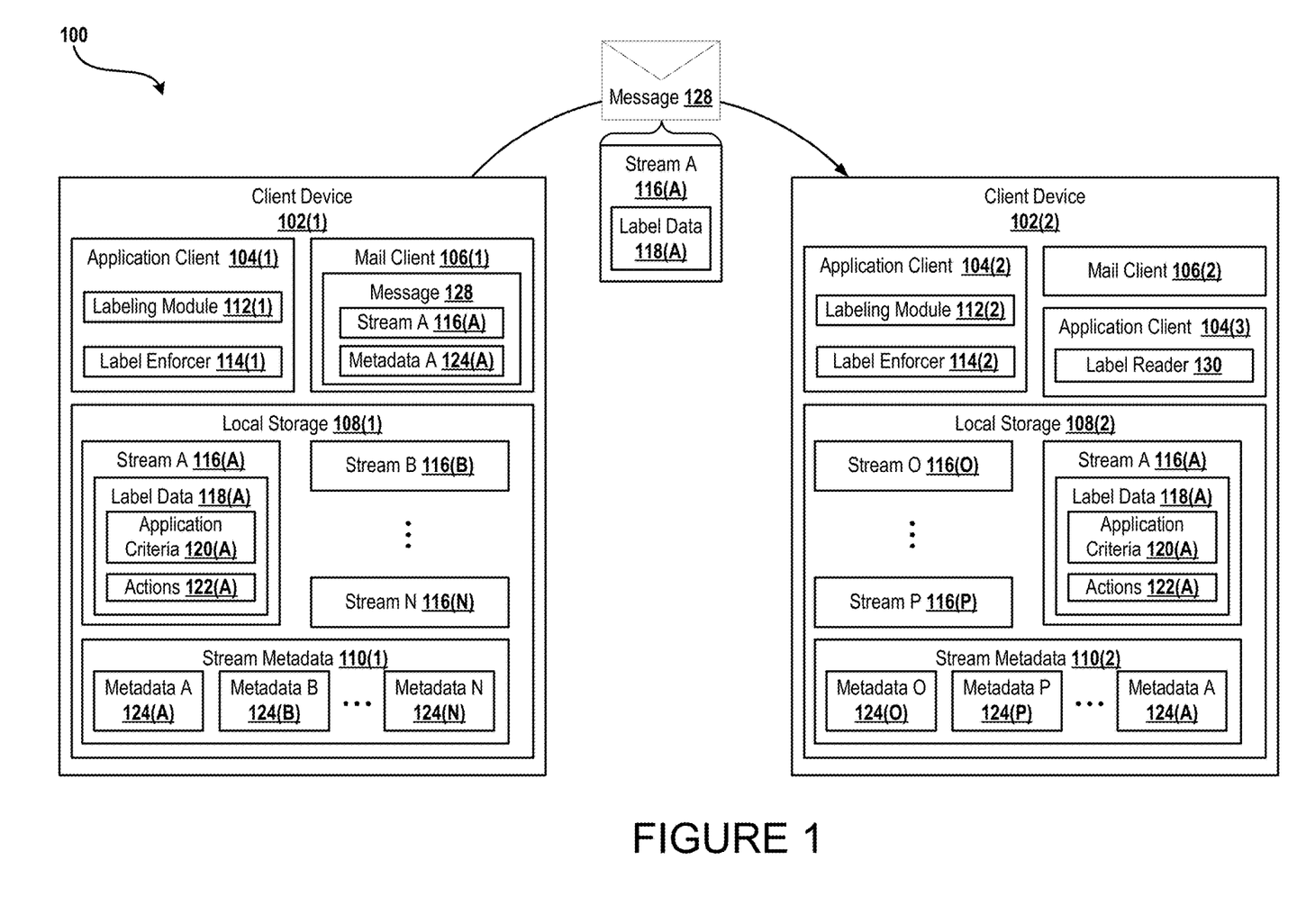
FIG. 1 illustrates an exemplary system in which label data is written to a stream of a data file to enable a file management label to persist on the data file even after the data file is transferred between discrete computing platforms.

Turning now to FIG. 1, an exemplary system 100 is illustrated in which label data is written to a stream of a data file to enable a file management label to persist on the data file even after the data file is transferred between discrete computing platforms. In the illustrated scenario, a stream defining content of the data file is transferred from a first client device 102(1) to a second client device 102(2). As further illustrated, the first client device 102(1) is shown to include a first application client 104(1), a first mail client 106(1), a first local storage 108(1), and first stream metadata 110(1). As further illustrated, the second client device 102(2) is shown to include a second application client 104(2) and a third application client 104(3), a second mail client 106(2), a second local storage 108(2), and second stream metadata 110(2). Application clients 104 enable users to view and/or modify the content of the data file by accessing the stream to display and/or enable modifications of the content of the data file via a graphical user interface (GUI). Exemplary application clients 104 include, but are not limited to, ADOBE ACROBAT PRO, MICROSOFT WORD, MICROSOFT EXCEL, MICROSOFT POWERPOINT, and/or any other suitable software for viewing and/or modifying data files of various formats. Mail clients 106 enable users to receive, view, and/or transmit messages (e.g., HTML email files and/or any other suitable message type). Exemplary mail clients 106 include, but are not limited to, desktop-based mail clients (e.g., MICROSOFT OUTLOOK, APPLE IOS MAIL, and/or any other mail client suitable for providing non-web-based access to a user's email) and web-based mail clients (e.g. GOOGLE GMAIL, MICROSOFT HOTMAIL, MICROSOFT OUTLOOK.COM, YAHOO MAIL, and/or any other mail client suitable for providing access to a user's email via a standard Internet web browser). Local storage 108 includes one or more non-volatile data storage devices (e.g., a SATA-Type Hard Disk, SATA-Type solid state hard drive, a USB flash drive, etc.) and/or volatile data storage devices (e.g., Random Access Memory (RAM), etc.) that may store a plurality of streams 116 as illustrated. Stream metadata 110 may indicate various properties corresponding to individual ones of the streams 116. Exemplary properties include, but are not limited to, a file type corresponding to an individual stream (e.g., as indicated by a file extension such as "docx," ".xlsm," ".xlsx," etc.) that indicates which application(s) can be used to open an individual stream 116, a size of the stream (e.g., in terms of bytes), a data of creation of the data file, an author of the data file, etc.

In some implementations, the first application client 104(1) includes a corresponding labeling module 112(1) that enables a user to associate a file management label with the data file while the first application client 104(1) has the data file in an "open" state. For example, suppose that the data file is an Office Open XML (OOXML) formatted data file such as, for example, a ".docx" file and that the content of this data file is stored in the first local storage 108(1) within Stream A 116(A). In this example, the first client device 102(1) may receive an instruction to open the data file using the first application client 104(1) due to this application client being a default application with respect to the indicated file extension of the data file (e.g., ".docx"). As a more specific but nonlimiting example, the first client device 102(1) may receive an instruction to open the data file wherein the instruction indicates the stream that corresponds to the data file and the file extension of the data file (e.g., an Open(Stream=Stream A 116(A), FormatType=.docx) Method instruction). Accordingly, the first client device 102(1) may deploy the first application client 104(1) to access Stream A 116(A) to open and, ultimately, to enable the user to view and/or modify content of the data file. While the data file is open within the first application client 104(1), the labeling module 112(1) enables label data 118(A) to be written directly into the stream of any particular data file. For example, as shown in more detail with respect to FIG. 3, labeling module(s) 112 may enable a user to read and/or modify label data 118 with respect to an individual data file that is currently open within an application client 104. Then, when the application client 104 saves a current state of the individual data file (e.g., responsive to a user clicking a "Save" user interface (UI) element), the application client 104 and/or client device 102 may write the label data 118 directly into the stream 118 of the individual data file. It can therefore be appreciated that in essence a file management label may become an integral part of an individual data file (e.g., the file management label is merged with/into the data file).

In some implementations, the label data 118 may indicate a label name, application criteria 120 indicating one or more characteristics that may result in an individual file management label being applicable to an individual data file, and/or one or more actions 122 to perform with respect to individual data files that have been associated with an individual file management label. As a more specific but nonlimiting example, an organization may be required to retain tax related documents for at least a predefined period of time (e.g., a "minimum retention period"). Accordingly, the organization may define a retention policy for tax related documents that includes retaining the documents for the predefined period of time (e.g., to comply with government regulations) and then immediately deleting the documents (e.g., for risk management purposes). Under these circumstances, the label data 118(A) may define a "Tax Record" file management label (e.g., the name of this individual file management label is "Tax Record"). The label data 118(A) may further define application criteria 120(A) that indicates specific characteristics which result in individual data files being classified as tax records. For example, the application criteria 120(A) may indicate that any data file that includes the organization's Federal Tax Identification Number (e.g., an EIN) is to be classified as a tax record for file management purposes. The label data 118(A) may further define actions 122(A) that are to be performed with respect to individual data files that are classified as tax records. For example, the actions 122(A) may indicate that tax records are to be forcibly retained for a period of seven years and then immediately disposed of. It can be appreciated therefore that according to the presently disclosed techniques individual file management labels are essentially self-contained objects. For example, no supplementary database need be accessed to determine why any individual data file is labeled with a particular file management label nor does any supplementary database need be accessed to determine what actions or to be performed with respect to individually labeled data files.

Figure 3:
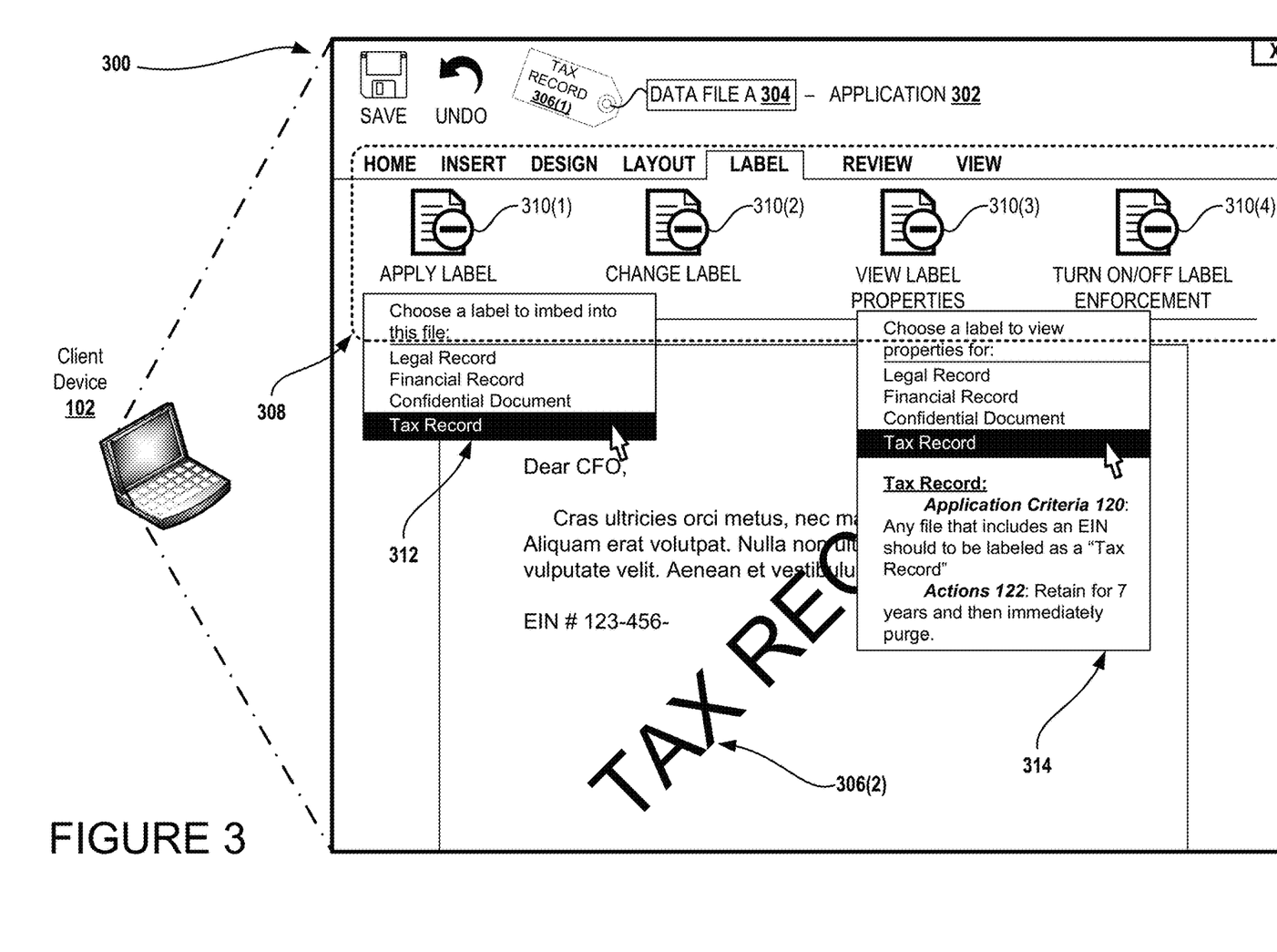
FIG. 3 illustrates aspects of a graphical user interface (GUI) of an application that can be displayed on a client device to enable a user to cause a labeling module to write label data into a stream that defines content of a data file.

In some implementations, the labeling module(s) 112 may enable users to manually apply file management labels to individual data files. For example, as shown in FIG. 3, the labeling module(s) 112 may be an integral part of the application client(s) 104 (e.g., a "plug-in," etc.) that exposes one or more user interface (UI) elements to enable selection of a file management label(s) to associate with an individual data file that is currently open. In some implementations, the labeling module(s) 112 may communicate information associated with the application criteria 120 and/or actions 122 to a user. For example, upon a user hovering a cursor over a tax record UI element, the labeling module 112 may indicate via a graphical user interface (GUI) that documents including the organization's EIN number are to be classified as tax records and/or that such tax records are to be forcibly preserved for seven years and then immediately disposed of. It can be appreciated that communicating information associated with the application criteria 120 and/or actions 122 may be helpful in assisting a user quickly determine—while a file is open—whether a particular file management label should be applied to an individual data file and/or whether one or more actions should be performed with respect to the individual data file.

In some implementations, the labeling module(s) 112 may be configured to analyze content of an individual data file to determine whether a file management label(s) should be applied to the individual data file. For example, the labeling module 122(1) may run background operations to analyze the content of an individual data file while a user has the individual data file open within the first application client 104(1). Then, in response to a user typing and/or pasting data associated with the application criteria 120(A) into the individual data file, the labeling module 122(1) may determine that a particular file management label (e.g., the "Tax Record" file management label) is applicable to the individual data file. In some implementations, the labeling module(s) 112 may be configured to automatically apply file management labels to individual data files based on the content of the date of filing the application criteria 120. As a specific but nonlimiting example, upon a user typing the organization's EIN into an individual data file via the first application client 104(1), the labeling module 122(1) may automatically write the label data 118(A) into Stream A 116(A) (e.g., the label data 118(A) may be written into hidden fields of the data file)—with or without notifying the user.

In some implementations, the labeling module(s) may be configured to notify a user that a particular file management label includes application criteria 120 that matches an individual data file. As a specific but nonlimiting example, upon a user typing the organization's EIN into an individual data file via the first application client 104(1), the labeling module 122(1) may cause a pop-up notification to be exposed to the user to inform the user that the application criteria 120(A) matches the individual data file based on the inclusion of the organization's EIN. Then, upon being informed via the notification that the individual data file is ostensibly a tax record, the user may make a final determination as to whether to apply the "Tax Record" file management label.

In some implementations, one or more of the application clients 104 may include a corresponding label enforcer 114 that enforces the actions 122 with respect to individual data files. For example, continuing with the "Tax Record" file management label example, suppose that an individual data file that is six years old and that has been labeled as a tax record (e.g., by having the label data 118(A) written into Stream A 116(A)) is currently open within the first application client 104(1). Further suppose that a user attempts to delete and/or modify various aspects of the individual data file notwithstanding the actions 122(A) indicating that tax records are to be preserved for seven years. Under these circumstances, the label enforcer 114(1) may prevent the deletions and/or modifications from being saved into Stream A 116(A). Alternatively, the label enforcer 114(1) may enter the deletions and/or modifications in conjunction with versioning data (e.g., via a "Track Changes" functionality of the application client 104) to maintain a record of the content in the absence of the deletions and modifications. As another example, suppose that a user attempts to utilize an application client 104 to open an individual data file that is nine years old and that has been labeled as a tax record and, therefore, should have been deleted immediately upon reaching seven years of age. Under these circumstances, the application client 104(1) may deploy the label enforcer 114(1) to analyze the label data 118(A) to determine whether the actions 122(A) permit the individual data file to be accessed by the user at this time. Then, before any of the content of the individual data file is exposed to the user, the label enforcer 114(1) may determine that the actions 122(A) indicate that the individual data file should have been deleted. Ultimately, the label enforcer 114(1) may respond by corrupting and/or overwriting Stream A 116(A) to prevent any current and/or future unauthorized access of the individual data file.

In some implementations, the application client(s) 104 may be configured to encrypt the stream(s) 116 each time an individual data file is closed. Then, the next time a user attempts to open the individual data file using the application client(s) 104, the label enforcer(s) 114 may be deployed to determine whether actions 122 corresponding to the individual data file permit the individual data file to be opened. It can be appreciated that under these circumstances although individual data files may not actually be deleted from local storage 108 immediately upon reaching a predetermined age indicated by the actions 122 (e.g., seven years in the current "Tax Record" example), the individual data files may become inaccessible upon reaching the predetermined age.

With respect to the file management label(s) persisting on data file(s) even after the data file(s) are transferred between discrete computing platforms, FIG. 1 shows Stream A 116(A) being transmitted from the first client device 102(1) to the second client device 102(2) within a message 128 that is generated and transmitted by the first mail client 106(1). For example, a user may open the first mail client 106(1) and begin transcribing an email message. The user may attach the individual data file to the message 128 (e.g., by performing a drag-and-drop operation during which an icon representing the individual data file is dropped into the message 128). Then, responsive to an indication that the individual data file is to be attached to the message 128, the first mail client 106(1) may include data of Stream A 116(A) within the message 128. Ultimately, when the user instructs the first mail client 106(1) to send the message 128 to a designated recipient, the data of Stream A 116(A) which includes the label data 118(A) is transmitted along with any other data of the message 128 to a mailbox of the designated recipient (e.g., an OUTLOOK mailbox, a GMAIL mailbox, a HOTMAIL mailbox, etc.).

Then, another user associated with the second client device 102(2) may utilize the second mail client 106(2) to access the message 128 and to download the individual data file from the message 128 to the second local storage 108(2). Then, the other user may instruct the second client device 102(2) to open the individual data file utilizing the second application client 104(2) and/or the third application client 104(3). In the illustrated scenario, the second application client 104(2) is substantially identical to the first application client 104(1). For example, each of the first application client 104(1) and the second application client 104(2) may be instances of the same desktop-based word processing application (e.g., MICROSOFT WORD). Accordingly, the second application client 104(2) may include any functionality described with respect to the first application client 104(1) including, but not limited to, functionality described with respect to the labeling module(s) and label enforcer(s) 114.

In some implementations, the individual data file may be opened on the third application client 104(3) which is a different application client than the first application client 104(1). For example, the third application 104(3) may be a third-party application with respect to the first application client 104(1) (i.e., the respective application clients correspond to and/or be written/supplied by different business entities). As a more specific but nonlimiting example, the first application client 104(1) may be one of the widely used application clients associated with the MICROSOFT OFFICE SUITE (e.g., MICROSOFT WORD, MICROSOFT POWERPOINT, MICROSOFT EXCEL, etc.) while the third application client 104(3) may correspond to a business entity other than Microsoft (e.g., ADOBE, GOOGLE, ZOHO, etc.). In the illustrated scenario, the third application client 104(3) includes a label reader 130 that enables the third application client 104(3) to read the label data 118 and/or expose information associated with the label data 118 to a user that opens and/or attempts to open the individual data file using the third application client 104(3).

Figure 2:
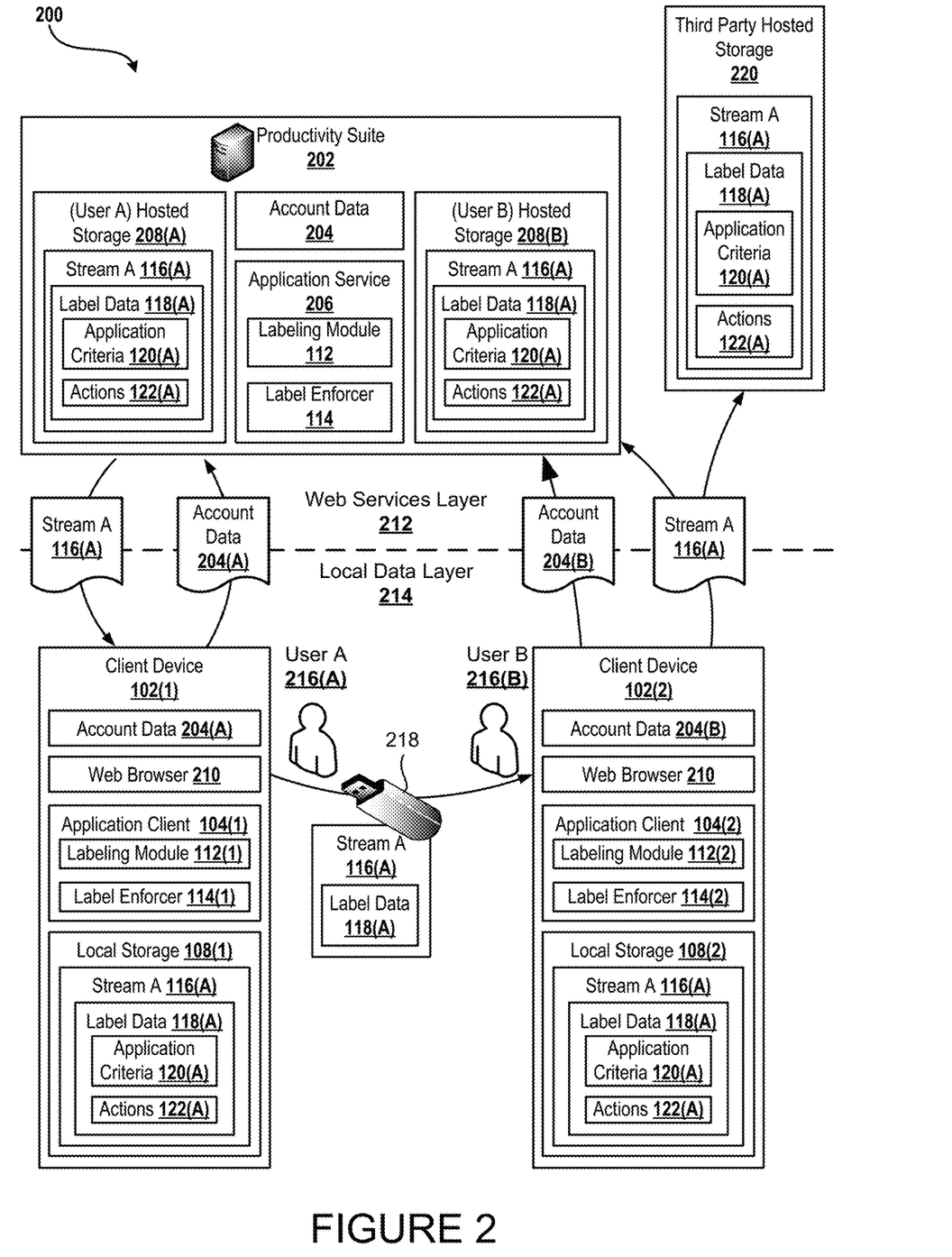
FIG. 2 illustrates an exemplary system in which a productivity suite deploys an application service to write label data that defines a file management label directly into a stream of a data file.

Turning now to FIG. 2, an exemplary system 200 is illustrated in which a productivity suite 202 deploys an application service 206 to write label data 118 to a stream 116 that defines content of the data file. Exemplary productivity suites include, but are not limited to, GOOGLE G-SUITE, ZOHO OFFICE SUITE, or MICROSOFT OFFICE 365. In some embodiments, the productivity suite 202 may provision the application service 206 with access to hosted storage 208 associated with individual user accounts that are defined by account data 204. Exemplary account data 204 includes, but is not limited to, user credentials associated with individual users and/or account settings corresponding to the individual user accounts. In some implementations, a user may provide user credentials (e.g., a password and/or a token) to the productivity Suite 202 to be provisioned with access to the application service 206. The application service 206 may be configured to enable a user to open, view, edit, create, save, copy, or otherwise manipulate files such as, for example, text documents, spreadsheets, and/or presentation documents. Exemplary application services include, but are not limited to, MICROSOFT WORD ONLINE, MICROSOFT EXCEL ONLINE, MICROSOFT POWERPOINT ONLINE, GOOGLE DOCS, GOOGLE SHEETS, and/or GOOGLE SLIDES.

As used herein, the term "application" may refer generally to any software that is specifically configured for producing, modifying, and/or accessing information such as, for example, email, word processing documents, presentations, and/or workbooks (a.k.a. "worksheets"). Furthermore, the term "application client" may refer to any "application" that is locally run on a client device (e.g., a Smart Phone, a Tablet PC, a Laptop PC, or any other general-purpose computing device). In contrast, the term "application service" may refer to any "application" that is a web-based software that is run remotely from a client device and exposed to the client device (e.g., via a web browser application).

FIG. 2 further illustrates an exemplary dataflow scenario in which a label data that defines a file management label persists on a data file even after a first user (e.g., User A 216(A)) passes the data file to a second user (e.g., User B 216(B)) via an unsecured drive 218 (e.g., a portable USB drive with no records management capabilities whatsoever). In the illustrated scenario, User A 216(A) uses the first client device 102(1) to pass aspects of the account data 204(A) to the productivity Suite 202. For example, User A 216(A) may use a web browser 210 (e.g., GOOGLE CHROME) to provide the productivity Suite 202 with user credentials such as, for example, user name and a password combination. Upon authenticating User A 216(A), the productivity Suite 202 provisions User A 216(A) with access to corresponding hosted storage 208(A) and the application service 206. For example, the productivity Suite 202 enables User A 216(A) to create the data file from scratch or to access hosted storage 208(A) to open, modify, and ultimately save the data file back to the host storage 208(A).

User A 216(A) then utilizes the web browser 210 to access the application service 206 and, more specifically, a labeling module 112 of the application service 206 to associate one or more file management labels with an individual data file. The labeling module 112 then saves label data 118(A) that defines the association directly into Stream A 116(A) which also defines the content of the data file. As described in relation to FIG. 1, in various implementations the label data 118(A) may include application criteria 120(A) and/or actions 122(A).

User A 216(A) then downloads Steam A 116(A) from a Web services layer 212 at which the productivity Suite 202 resides to a local data layer 214 at which the individual client devices 102 reside. For example, Stream A 116(A) may be downloaded from hosted storage 208(A) (e.g., a server supporting MICROSOFT ONEDRIVE and/or any other online file hosting service) onto a local hard drive and/or cache of the client device 102(1). Then, Stream A 116(A) may be copied to the unsecured drive 218 and physically handed to User B 216(B) who then plugs the unsecured drive 218 into the second client device 102(2). In some implementations, the unsecured drive 218 is a basic USB flash drive that is configured only to store data and includes no ability to read and/or analyze data and/or implement any sort of records management functionality. As illustrated, the second client device 102(2) copies Stream A 116(A) from the unsecured drive 218 to its corresponding local storage 108(2). As further illustrated, User B 216(B) provides aspects of the account data 204(B) to the productivity Suite 202 to be provisioned with access to the application service 206 and/or corresponding hosted storage 208(B). Ultimately, stream A 116(A) is further copied to hosted storage 208(B).

Additionally or alternatively, User B 216(B) (and/or User A 216(A) for that matter) may save a copy Stream A 116(A) onto a third party hosted storage 220 that is unassociated with the productivity Suite 202. For example, in an instance in which the productivity suite corresponds to MICROSOFT OFFICE 365, the third party hosted storage 220 may correspond to a DROPBOX account and/or any other online storage service that is unassociated with the productivity Suite 202. As illustrated, since the label data 118(A) is essentially an integral part of Stream A 116(A), and a file management label (e.g., that is defined within the label data 118(A)) persists on the data file (e.g., that is defined by Stream A 116(A)) even when the data file is propagated to computing devices and/or storage services that are unassociated with the productivity Suite 202.

Accordingly, it can be appreciated that in the illustrated scenario the data file has been propagated throughout the system 200 such that discrete instances of Stream A 116(A) now exist on User A's hosted storage 208(A), the local storage 108(1) of the first client device 102(1), the unsecured drive 218, the local storage 108(2) of the second client device 102(2), User B's posted storage 208(B), and also the third party hosted storage 220. It can further be appreciated that the label data 118(A), including application criteria 120(A) and/or actions 122(A) if applicable, has persisted on each discrete instance of Stream A 116(A) rather than "falling off" when the data file was propagated between discrete computing systems (e.g., when the data file was transferred from the productivity Suite 202 to the first client device 102(1), transferred from the first client device 102(1) to the second client device 102(2), and so on). Accordingly, no matter which "application" within the system 200 is utilized to open an instance of the data file, a corresponding labeling module 112 is able to access the label data 118(A) to determine whether any particular file management label is associated with the data file.

In some implementations, the label data 118 defining the file management label may be configured according to at least one standardized format to enable a plurality of different applications (e.g., application clients 104 and/or application services 206) and/or computing platforms (e.g., productivity Suite 202 and/or third party hosted storage 220) to read the label data from one or more streams and/or write label data to one or more streams.

Turning now to FIG. 3, aspects are illustrated of a graphical user interface (GUI) 300 of an application 302 that can be displayed on a client device 102 to enable a user to cause a labeling module 112 to write label data 118 to a stream 116 that defines content of a data file 304. The GUI 300 corresponds to an implementation in which the application 302 is a word processing-type application such as, for example, MICROSOFT WORD (online or desktop version), GOOGLE DOCS, etc. It can be appreciated however that the illustrated implementation is for illustrative purposes only and that aspects of the GUI 300 can be incorporated into any other suitable type of application.

In some implementations, the GUI 300 may include one or more graphical elements 306 to communicate aspects of a file management label that has been associated with a data file that is currently open within the application 302. In the illustrated example, a "Tax Record" file management label data has been associated with data file A 304 which is currently open within the application 302. In this example, a first graphical element 306(1) is illustrated near the top of the GUI 300 in the form of a "Tag" or "Label" that is affixed to the file name. In particular, the GUI 300 includes a graphical representation of a physical merchandise tag adjacent to the name of the currently open data file. In some implementations, the labeling module 112 of the application 302 may cause a watermark graphical element 306(2) to be composited over and/or under content of the data file 304 that is being displayed within the GUI 300.

In some implementations, the GUI 300 may include a ribbon 308 that exposes one or more user interface (UI) elements 310 that enable a user to deploy one or more functionalities of the labeling module 112. As used herein, the term "ribbon" is used in the context of computer interface design and may generally refer to a graphical control element in the form of a set of toolbars placed on several tabs. Exemplary tabs include, but are not limited to, a "HOME" tab, an "INSERT" tab, a "DESIGN" tab, a "LAYOUT" tab, a "LABEL" tab, a "REVIEW" tab, and/or a "VIEW." In the illustrated example, the ribbon 308 is illustrated with the "LABEL" tab selected to expose the one or more UI elements 310 associated with the labeling module 112.

In some embodiments, the GUI 300 may include a UI element 310(1) that enables a user to apply a file management label to a data file that is currently open within the application 302. For example, as illustrated a user has selected the UI element 310(1) to expose a label selection drop-down menu 312 which provides the user with options to associate one or more individual file management labels with the currently open data file.

In some embodiments, the GUI 300 may include a UI element 310(2) that enables a user to change a file management label that has been applied to the currently open data file. For example, the user may open the data file 304 and discover that it has been labeled as a tax record (e.g., upon seeing the watermark 306(2)) but may determine that the data file 304 is not actually a tax record. Under these circumstances, the user may select the UI element 310(2) to remove the association between the currently open data file 304 and the "Tax Record" file management label and/or apply a different file management label to the currently open data file.

In some embodiments, the GUI 300 may include a UI element 310(3) that enables a user to view properties associated with one or more file management labels. For example, upon selection of the UI element 310(3) various aspects of the label data 118 may be graphically exposed to the user. As a more specific but nonlimiting example, the user may click on the UI element 310(3) and then select and icon associated with the "Tax Record" file management label to expose a graphical interface element 314 that graphically displays application criteria 120 and/or actions 122 associated with any particular selected file management label. As illustrated, because the cursor is hovering over the "Tax Record" icon, the graphical interface element 314 is shown to indicate that any file that includes an EIN should be labeled as a "Tax Record" and furthermore that tax records are to be retained for seven years and then immediately purged. It can be appreciated that enabling users to view file management label properties from directly within an application GUI 300 may streamline records management tasks (e.g., by mitigating and/or obviating the need for a user to access supplementary resources to determine whether any particular file management label should be applied to a data file that the user is currently accessing via the application 302).

In some embodiments, the GUI 300 may include a UI element 310(4) that enables a user to turn on or off label enforcement functionality with respect to a currently open data file. For example, upon selection of the UI element 310(4) a user may be enabled to save into the label data 118 instructions for the label enforcer 114. Exemplary instructions include, but are not limited to, instructions that cause the label enforcer 114 to strictly enforce the actions 122, instructions that caused the label enforcer 114 to inform a user of the actions 122 as they become applicable (e.g., when a user uses the application 304 to access a data file that should have been deleted the label enforcer 114 may expose a notification to the user that suggests deletion of the file), and/or instructions that cause the label enforcer 114 not to enforce one or more actions 1 to 2 with respect to one or more individual datafiles.

In some embodiments, various functionalities associated with one or more of the UI elements 310 of the GUI 300 may correspond to various restrictions and/or permissions as defined by account data 204. For example, a first user may have a greater authority than a second user and, therefore, may be able to change file management labels that the second user has applied but not vice versa.

Figure 4:
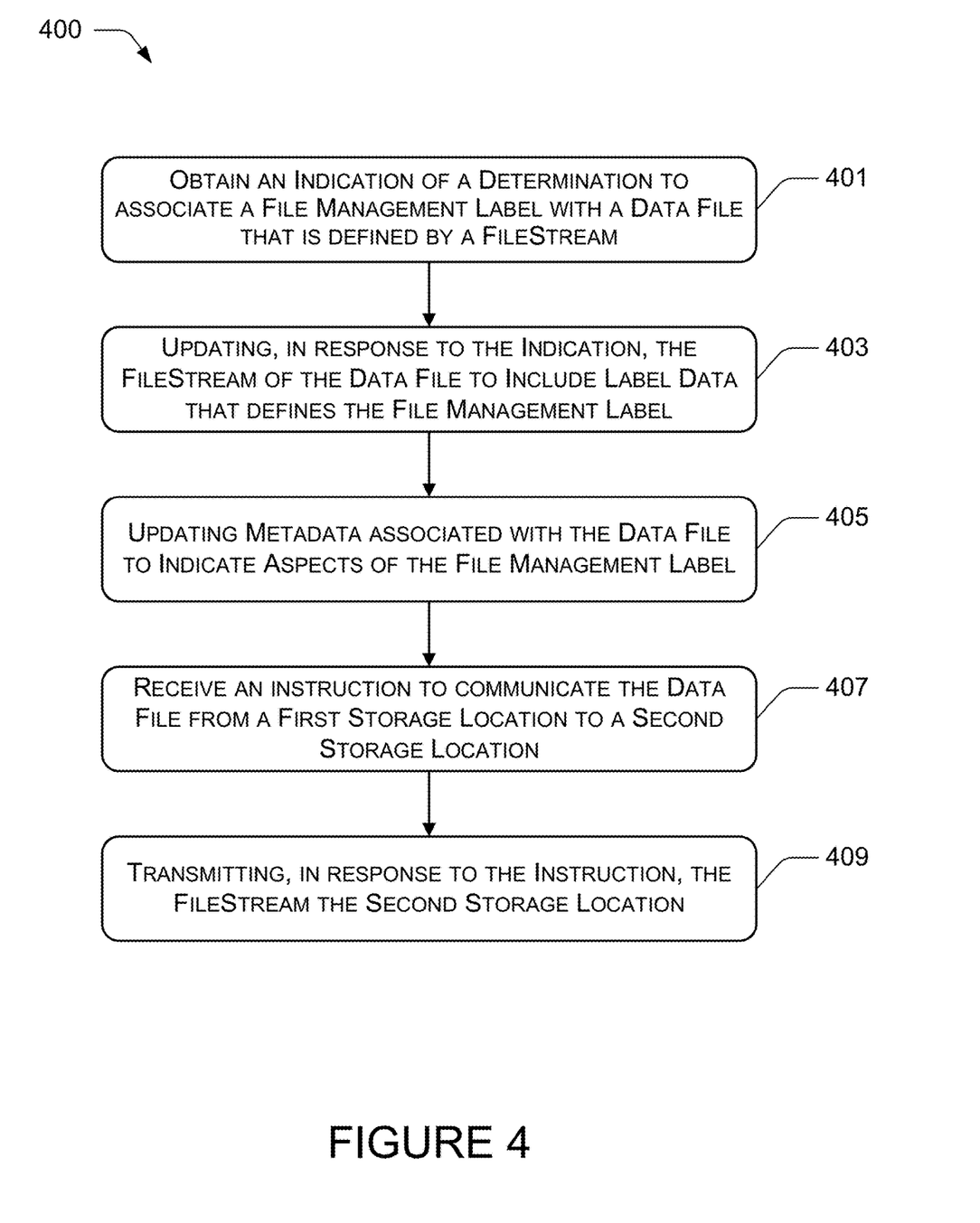
FIG. 4 is a flow diagram of an example process of writing label data that at least partially defines a file management label to a stream that at least partially defines content of a data file.
Figure 5:
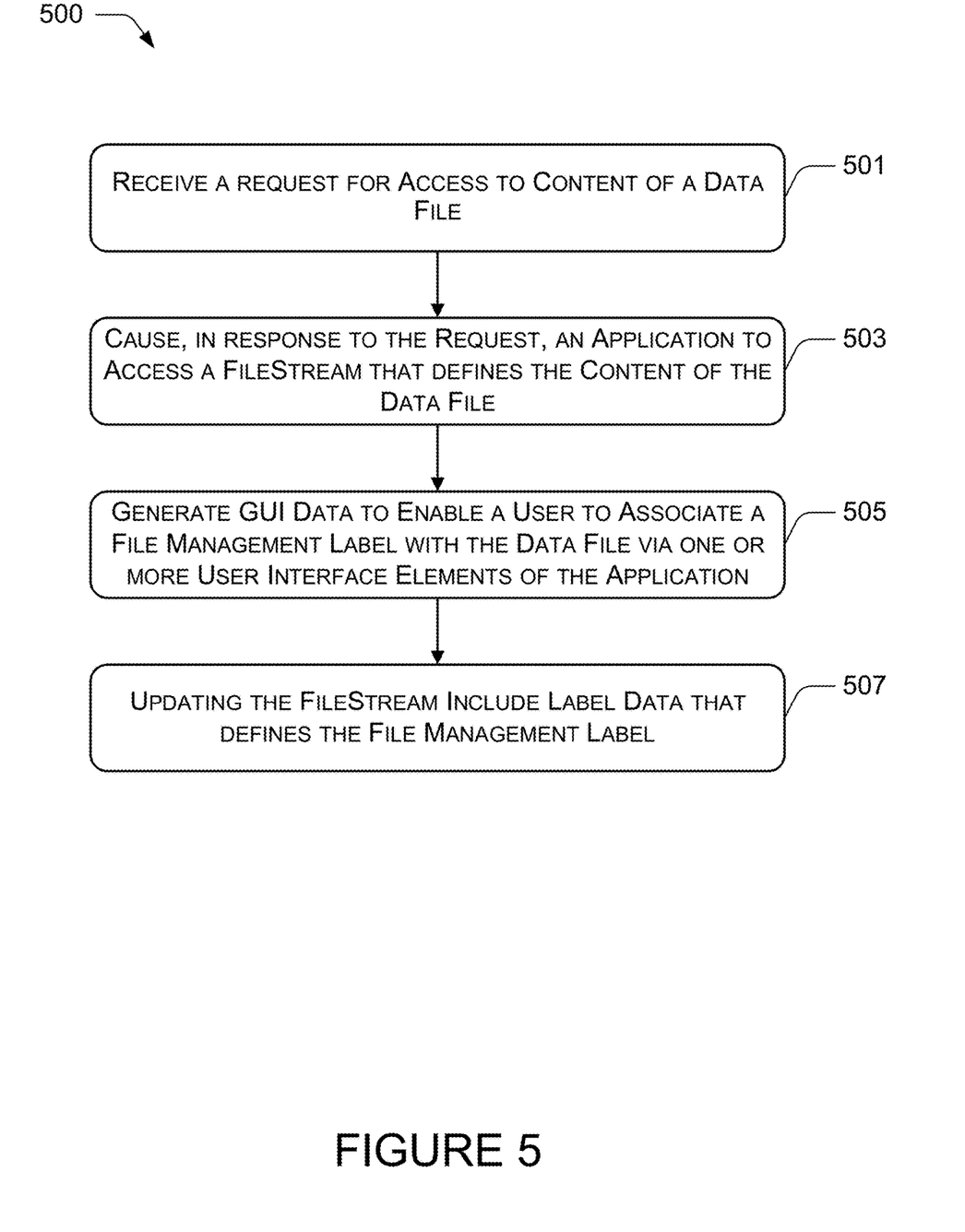
FIG. 5 is a flow diagram of an example process of generating GUI data to enable a user to associate a file management label with a data file by manipulating a user interface (UI) element that is displayed via an application GUI of an application that is provisioning access to content of the data file.

FIGS. 4 and 5 illustrate flow diagrams in association with example processes 400 and 500 which are described with reference to FIGS. 1-3. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Turning now to FIG. 4, a flow diagram illustrates an example process 400 of writing label data that at least partially defines a file management label to a stream (also referred to herein as "FileStream") that at least partially defines content of a data file.

At block 401, a system may obtain an indication of a determination to associate a file management label with the data file that is at least partially defined by a Stream. In some implementations, the determination may be made by a user that is viewing content of the data file via an application such as, for example, the application client 104(1) and/or the application service 206. For example, the user may generate and/or read the content of the data file and may have knowledge of application criteria 120 (e.g., that indicates characteristics of data files that result in the file management label being applicable thereto). Then, the user may manipulate one or more user interface (UI) elements such as, for example, the label selection drop-down menu 312 which provides the user with options to associate one or more individual file management labels the currently open data file.

In some implementations, the determination may be made automatically by a computing system (e.g., the client device 102(1) and/or the productivity Suite 202) based on an analysis of the data file with respect to one or more application criteria 120 of the file management label. For example, the application criteria 120 may indicate one or more sensitive content types based on predefined patterns that can be identified based on a regular expression (REGEX) and/or function. For example, the application criteria 120 may include an indication of a REGEX to cause the computing system to parse the content of the data file to identify one or more numbers strings and, ultimately, to analyze the one or more numbers strings to determine whether sensitive information (e.g., tax identification numbers, credit card numbers, etc.) are included within the content of the data file. As another example, the application criteria 120 may define a search query to be performed by the computing device against the content of the data file to cause the file management label to be associated with individual data files that contain at least one of a predefined set of terms. As a more specific but nonlimiting example, the application criteria 120 may define a search query to cause files that contain at least one of the terms "Tax*" or "Form 1099*" to be designated as tax records and, therefore, automatically labeled with a "Tax Record" file management label. Although any suitable search query language may be deployed to define application criteria 120, exemplary search query languages include the Keyword Query Language (KQL) and the FAST Query Language (FQL) which are included in MICROSOFT SHAREPOINT.

In various implementations, analysis of the data file with respect to the application criteria 120 may occur locally. For example, consider in a scenario in which a user is deploying application client 104(1) at the first client device 102(1) to view and/or edit a data file defined by Stream A 116(A). Here, the labeling module 112(1) may be deployed locally at the first device 102(1) to continually and/or periodically analyze the content of the data file with respect to the application criteria 120 to determine whether any particular file management label has become applicable (or has ceased to be applicable for that matter) to any particular data file. Additionally or alternatively, analysis of the data file with respect to the application criteria 120 may occur remotely. For example, continuing with the scenario in which the user is deploying application client 104(1) at the first client device 102(1) to view and/or edit the data file defined by Stream A 116(A), the application client 104(1) may cause the first client device 102(1) to periodically transmit Stream A 116(A), in whole or in part, to the productivity Suite 202 at which the labeling module 112 may be deployed by application service 206 to analyze the content of the data file with respect to the application criteria 120. Then, in the event that a particular file management label becomes applicable (or ceases to be applicable for that matter), the productivity Suite 202 may transmit instructions to the first client device 102(1) that cause Stream A 116(A) to be updated accordingly.

At block 403, the Stream may be updated responsive to the indication to include label data that at least partially defines the file management label. For example, label data 118 may be written directly into stream 116 to embed the file management label directly into the data file. In some implementations, the label data 118 that is written into the stream 116 includes application criteria 120 defining one or more characteristics that result in the file management label being applicable to the data file. In some implementations, the label data 118 that is written into the stream 116 includes actions 122 defining one or more records management actions (e.g., preservation of a data file for a predetermined time, deletion of a data file after a predetermined time, restricting editing of a data file, etc.).

At block 405, metadata associated with the data file may be updated to indicate aspects of the file management label. For example, stream metadata 110 may be updated so that metadata corresponding to the particular data file (e.g., Metadata A 124(A) in the present example) indicates that the file management label has been associated with the particular data file. In some implementations, updating the metadata to indicate aspects of the file management label enables a computing system and/or user to determine whether a particular data file has been associated with any file management label(s) without having to deploy an application to access the Stream. For example, in some implementations, updating the metadata may enable a user to perform a "right-click" operation on an icon, of the data file, that is generated by an operating system (e.g., a file icon generated by MICROSOFT WINDOWS) to expose properties associated with the data file. These properties may include one or more data fields associated with the presence and/or absence of associations between the data file and one or more file management labels.

Based on the foregoing discussion of blocks 403 and 405, it can be appreciated that execution of the techniques disclosed herein may comprise synchronous actions which occur immediately upon a determination that a particular file management label is to be associated with a particular data file as well as asynchronous actions which occur subsequent to the synchronous actions fully executed. In particular, the operations discussed with respect to blocks 403 and 405 may aptly be described as synchronous actions which occur responsive to the determination of block 401. In some implementations, the synchronous actions may include writing label data defining the asynchronous actions directly into the Stream and/or metadata of a particular data file. For example, with particular reference to FIG. 1, a synchronous action may include writing the actions 122(A) directly into Stream A 116(A). It can be appreciated that the actions 122 may define one or more asynchronous actions that are to be performed with respect to the data file at some point in the future based on the label data that has been associated with the data file. Exemplary asynchronous actions include, but are not limited to, forcibly retaining the data file for a predetermined minimum retention period (e.g., a computing action may correspond to denying a user request to delete a file), automatically purging a file from storage upon the file reaching a predetermined age, automatically encrypting and/or corrupting a data file upon a user attempting to open the data file after it has passed the predetermined age, and/or any other suitable action for performance after a data file has been labeled in accordance with a file management policy. Furthermore, a synchronous action may include writing the application criteria 120(A) directly into Stream A 116(A) to generate a record within the data file as to why the synchronous actions were performed in the first place (e.g., an indication of which characteristics of the data file were determined to be present which triggered the synchronous actions and, therefore, resultantly the asynchronous actions as well).

In some implementations, a synchronous action may include immediately encrypting a data file upon a determination to associate a file management label with the data file. For example, responsive to the determination of block 401 and the labeling module 112 and/or label enforcer 114 may be deployed to immediately encrypt the stream 116 to prevent future unauthorized access of the data file. Then, a corresponding asynchronous action (e.g., an asynchronous action corresponding to the encryption) may be to analyze the actions 122 upon a user attempting to open the data file and refraining from decrypting the stream 116 unless the actions permit the user to access the data file. Additionally or alternatively, a corresponding asynchronous action may include analyzing the actions 122 upon a user attempting to open the data file to determine whether this user has permission to access the data file. Then, if the user does have permission to access the data file, the stream 116 may be decrypted to provide such access. In contrast, if the user does not have permission to access the data file, the stream 116 may remain encrypted to prevent the unauthorized access. Accordingly, it can be appreciated that the techniques disclosed herein may be utilized to write actions 122 directly into a stream 116 which block/prevent unauthorized sharing of individual data files regardless of the means in which those datafiles were propagated between systems.

At block 407, an instruction may be received to communicate the data file from a first storage location to a second storage location. In some implementations, the instruction may correspond to communicating the data file over one or more networks. For example, as described in relation to FIG. 1, the instruction may correspond to a user attaching the data file to a message 128 which causes the client device to write the stream of the data file into the message 128 for transmission to an email service. In some implementations, the instruction may correspond to communicating the data file to a physical drive that is attached to the client device 102. For example, as described in relation to FIG. 2, an instruction may be received to copy the data file to a USB drive which may then in turn be used to communicate the data file to one or more other computing devices.

At block 409, the Stream may be transmitted to the second storage location in response to the instruction. For example, the Stream may be transmitted as an attachment to an email and/or may be transmitted to a USB drive that is attached locally to a client device 102.

Turning now to FIG. 5, a flow diagram illustrates an example process 500 of generating graphical user interface (GUI) data to enable a user to associate a file management label with a data file via a user interface (UI) element that is displayed by an application that is provisioning access to content of the data file.

At block 501, a request may be received in association with deploying an application to provision access to content of a data file. For example, a user may "double-click" on an icon associated with the data file that is generated by an operating system (e.g., a file icon generated by MICROSOFT WINDOWS) to cause a client device 102 to deploy an application client 104 to open the data file. As another example, a user may select and icon associated with the data file that is viewable via a web browser 210 to cause the productivity Suite 2022 deploy an application service 206 to open the data file and provision access to the data file via the web browser 210.

At block 503, in response to the request an application may be caused to access a stream that defines the content of the data file. For example, in a scenario in which the data file is a text document that is formatted according to the word processing application, the word processing application may be deployed to access and, ultimately, to interpret the stream to cause a computing device to render the content for viewing by a user. In particular, the application may provision access to the content via an application GUI such as, for example, the GUI 300.

At block 505, GUI data may be generated to cause the application GUI to include at least one user interface (UI) element that enables a user to associate a file management label with the data file. In particular, the user may manipulate a cursor and/or some other interface device (e.g., a touchscreen, a mouse, a voice control interface, etc.) to generate selection data to associate the file management label with the data file. For example, as shown in FIG. 3, various UI elements 310 may be displayed to enable the user to generate selection data associated with various label tasks. Exemplary label tasks include, but are not limited to, applying a file management label to a data file (e.g., associating the file management label with the data file), changing a file management label of a data file (e.g., removing an association between a file management label in the data file and/or generating a new association between the data file and a different file management label), giving label properties associated with a particular file management label, and/or turning on and/or off label enforcement for a particular data file and/or file management label.

At block 507, the Stream may be updated based on the selection data to include label data that at least partially defines the file management label. For example, label data 118 may be written directly into stream 116 to embed the file management label directly into the data file. In some implementations, the label data that is written into the stream includes application criteria defining one or more characteristics that result in the file management label being applicable to the data file. In some implementations, the label data that is written into the stream includes actions defining one or more records management actions (e.g., preservation of a data file for a predetermined time, deletion of a data file after a predetermined time, restricting editing of a data file, etc.).

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, net processing cycles on a system implementing the techniques described herein are drastically reduced over the system deploying conventional records management techniques for at least the reason that newly created instances of a data file defined by a stream with embedded label data do not need to be re-analyzed to determine any applicable file management labels. In contrast, because conventional records management techniques rely on external data objects (e.g., databases that are external to streams defining data files) to define associations between data files and file management labels, newly created instances of data files generally lose any predefined associations with file management labels and therefore either lack valuable records management data or must be reanalyzed to re-determine the records management data. Other technical effects other than those mentioned herein can also be realized from implementations of the technologies disclosed herein.

Figure 6:
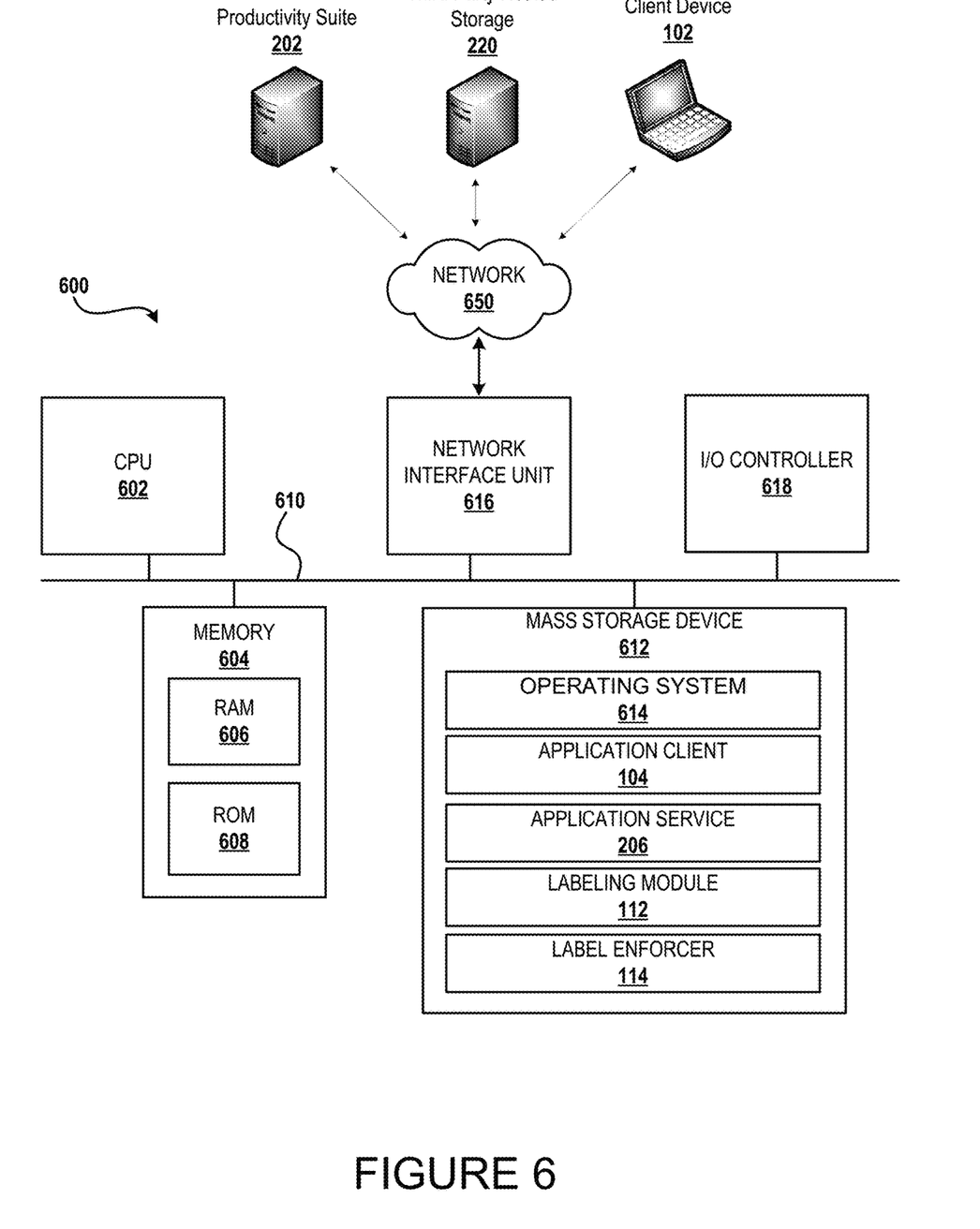
FIG. 6 shows additional details of an example computer architecture for a computer capable of executing the functionalities described herein.

FIG. 6 shows additional details of an example computer architecture for a computer capable of executing the functionalities described herein such as, for example, those described with reference to the application client 104 and/or application service 206 or any program components thereof as described herein. Thus, the computer architecture 600 illustrated in FIG. 6 illustrates an architecture for a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the application client 104, the application service 206, the labeling module 112, and/or the label enforcer 114.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 650 and/or another network (not shown). The computer architecture 600 may connect to the network 650 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 650 through a network interface unit 616, the computing architecture may enable the productivity suite 202, the third party hosted storage 220, and/or client devices 102 (e.g., the first client device 102(1) and the second client device 102(2)) to communicate with one another.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Example Clauses

The disclosure presented herein may be considered in view of the following clauses.

Example Clause A, a computer-implemented method, comprising: receiving a request associated with deploying an application to provision access to content of a data file, wherein the content is stored in a Steam corresponding to the data file; causing, in response to the request, the application to access the Stream to provision the access to the content via an application graphical user interface (GUI), wherein the application GUI facilities editing of the content of the data file; displaying, in response to a first user input, properties corresponding to a file management label, wherein the properties include at least one of: application criteria indicating one or more characteristics that result in the file management label being applicable to individual data files, or actions that are designated to be performed based on the file management label being applied to the individual data files; displaying at least one user interface element that enables a user to generate a second user input to associate the file management label with the data file; and based on the second user input, updating the Stream to include label data that applies the file management label to the data file, wherein the label data indicates the properties corresponding the file management label.

Example Clause B, the computer-implemented method of Example Clause A, wherein the properties include the actions that are designated to be performed based on the file management label being applied to the individual data files, and wherein the actions indicate at least one of: a predetermined time for the data file to be preserved, or a predetermined time after which the data file is to be deleted.

Example Clause C, the computer-implemented method of any one of Example Clauses A through B, further comprising receiving: an instruction to communicate the data file from a first storage location to a second storage location; and responsive to the instruction, transmitting the Stream that includes the label data to the second storage location.

Example Clause D, the computer-implemented method of any one of Example Clauses A through C, wherein the label data includes both the application criteria and the actions when the Stream is transmitted from the first storage location to the second storage location.

Example Clause E, the computer-implemented method of any one of Example Clauses A through D, further comprising displaying at least one user interface element that enables the user to toggle a label enforcement functionality between an on setting and an off setting.

Example Clause F, the computer-implemented method of any one of Example Clauses A through E, further comprising updating, in response to the second user input, metadata associated with the data file to indicate at least some aspects of the file management label.

Example Clause G, the computer-implemented method of any one of Example Clauses A through F, wherein the at least one user interface element further enables the user to: select between a plurality of file management labels to cause display of individual properties that correspond to individual ones of the plurality of file management labels, and select the individual ones of the plurality of file management labels to imbed into the Stream of the data file.

Example Clause H, a system, comprising: at least one processor; and at least one memory in communication with the at least one processor, the at least one memory having computer-readable instructions stored thereupon that, when executed by the at least one processor, cause the at least one processor to: receive a request associated with deploying an application to provision access to content of a data file; cause, in response to the request, the application to access a Stream that at least partially defines the content of the data file, wherein the application enables editing of the content via an application GUI that is displayed by a computing device; generate graphical user interface (GUI) data to cause the application GUI to include at least one user interface element that enables a user to generate selection data to associate a file management label with the data file; based on the selection data, updating the Stream to include label data that indicates application criteria indicating one or more characteristics that result in the file management label being applicable to individual files.

Example Clause I, the computer-implemented method of Example Clause H, wherein the computer-readable instructions further cause the system to display properties corresponding to the file management label, wherein the properties include at least: the application criteria, and actions that are designated to be performed based on the file management label being applied to the individual data files.

Example Clause J, the computer-implemented method of any one of Example Clauses H through I, wherein updating the Stream to include the label data includes writing one or more actions corresponding to the file management label into the Stream, and wherein the one or more actions are executable by a label enforcer of the application.

Example Clause K, the computer-implemented method of any one of Example Clauses H through J, wherein the computer-readable instructions further cause the system to: analyze the content of the data file to determine whether the application criteria of the file management label are satisfied by the content; and responsive to the application criteria being satisfied, notify the user that the application criteria match the content of the data file.

Example Clause L, the computer-implemented method of any one of Example Clauses H through K, wherein the computer-readable instructions further cause the system to: subsequent to the file management label being applied to the data file, receive a second request associated with deploying the application to provision access to the content of the data file; prior to exposing the content based on the second request, determine that one or more actions of the file management label indicate that the data file should have been deleted; and prevent access to the content of the data file based on the second request.

Example Clause M, the computer-implemented method of Example Clause L, wherein preventing access to the content of the data file includes at least one of corrupting the Stream or overwriting the Stream in response to determining that the data file should have been deleted.

Example Clause N, the computer-implemented method of any one of Example Clauses H through M, wherein the computer-readable instructions further cause the system to enable the user to toggle a label enforcement functionality between an on setting and an off setting, wherein the label enforcement functionality generates instructions for a label enforcer of the application.

Example Clause O, the computer-implemented method of any one of Example Clauses H through N, wherein the instructions cause the label enforcer to inform one or more users when actions defined by the file management label become applicable to the data file.

Example Clause P, the computer-implemented method of any one of Example Clauses H through O, wherein the computer-readable instructions further cause the system to update, in response to the selection data, metadata associated with the data file to indicate at least some aspects of the file management label.

Example Clause Q, a computer-implemented method, comprising: obtaining an indication of a determination to associate a file management label with a data file, wherein content of the data file is at least partially defined by a Stream that is stored in a first storage location; updating, in response to the indication, the Stream to include label data that defines one or more aspects of the file management label; receiving an instruction to communicate the data file from the first storage location to a second storage location; and transmitting, in response to the instruction, at least the Stream to communicate the data file to the second storage location, wherein the label data that defines the one or more aspects of the file management label persists on the data file at the second storage location.

Example Clause R, the computer-implemented method of Example Clause Q, further comprising updating, in response to the indication, metadata associated with the data file to indicate at least one of the one or more aspects of the file management label.

Example Clause S, the computer-implemented method of any one of Example Clauses Q through R, wherein updating the Stream to include the label data includes writing application criteria corresponding to the file management label into the Stream that at least partially defines the content of the data file.

Example Clause T, the computer-implemented method of any one of Example Clauses Q through S, wherein updating the Stream to include the label data includes writing one or more actions corresponding to the file management label into the Stream that at least partially defines the content of the data file.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
  receiving a request for access, via an application that is executable by an operating system, to content of a data file, wherein the content:
    is defined within a stream, corresponding to the data file, that is an object of an object class associated with the operating system, and
    is different than metadata that corresponds to the data file;
  causing, in response to the request, the application to access the stream and provide the access to the content via an application graphical user interface (GUI) that is configured to facilitate editing of the content of the data file;
  in response to a first user input generated via the application GUI, causing display of a property corresponding to a file management label, wherein the property includes:
    application criteria that result in the file management label being applicable to individual data files, or
    an action identifier that indicates a file management action that is applicable to the individual data files based on the file management label being applied to the individual data files;
  receiving a second user input, generated via the application GUI, that corresponds to an instruction to associate the file management label with the data file; and based on the second user input, causing the application to perform a save operation that updates the stream to include label data that indicates the property corresponding the file management label.

2. The computer-implemented method of claim 1, wherein the property includes the action identifier, and wherein the file management action indicates at least one of: a predetermined time for the data file to be preserved, or a predetermined time after which the data file is to be deleted.

3. The computer-implemented method of claim 1, further comprising receiving:
another instruction to communicate the data file from a first storage location to a second storage location; and
responsive to the other instruction, transmitting the stream that includes the label data to the second storage location.

4. The computer-implemented method of claim 1, wherein the label data, that is included within the stream as a result of the save operation, includes both the application criteria and the file management action.

5. The computer-implemented method of claim 1, further comprising causing display of a user interface element that is selectable to toggle a label enforcement functionality between an on setting and an off setting.

6. The computer-implemented method of claim 1, further comprising updating, in response to the second user input, the metadata associated with the data file to indicate an aspect of the file management label.

7. The computer-implemented method of claim 1, wherein the application GUI is further configured to facilitate:
selecting between a plurality of file management labels to cause display of individual properties that correspond to individual ones of the plurality of file management labels, and
selecting the individual ones of the plurality of file management labels to imbed into the stream of the data file.

8. A system, comprising:
at least one processor; and
at least one memory in communication with the at least one processor, the at least one memory having computer-readable instructions stored thereupon that, when executed by the at least one processor, cause the at least one processor to:
receive a request for access, via an application that is executable by an operating system, to content of a data file, wherein the content is defined within a stream that is an object of an object class associated with the operating system;
cause, in response to the request, the application to access the stream and provide the access to the content of the data file, wherein the application enables editing of the content via an application GUI that is displayed by a computing device;
generate graphical user interface (GUI) data to cause the application GUI to include a user interface element that facilitates generation of selection data that associates a file management label with the data file;
based on the selection data, cause the application to perform a save operation that updates the stream to include label data that indicates application criteria indicating a characteristic that results in the file management label being applicable to individual files.

9. The system of claim 8, wherein the computer-readable instructions further cause the system to cause a display of a property corresponding to the file management label, wherein the property includes: the application criteria, and a file management action that is applicable to individual data files based on the file management label being applied to the individual data files.

10. The system of claim 8, wherein updating the stream to include the label data includes writing data that identifies the file management action, corresponding to the file management label, into the stream, and wherein the file management action is executable by a label enforcer of the application.

11. The system of claim 8, wherein the computer-readable instructions further cause the system to:
analyze the content of the data file to determine whether the application criteria of the file management label are satisfied by the content; and
responsive to the application criteria being satisfied, expose a human-perceptible notification indicating that the application criteria are satisfied by the content of the data file.

12. The system of claim 8, wherein the computer-readable instructions further cause the system to:
subsequent to the file management label being applied to the data file, receive a second request for access to the content of the data file;
prior to exposing the content based on the second request, determine that a file management action that corresponds to the file management label indicates that the data file should have been deleted; and
prevent access to the content of the data file.

13. The system of claim 12, wherein preventing access to the content of the data file in response to determining that the data file should have been deleted includes: corrupting the stream, or overwriting the stream.

14. The system of claim 8, wherein the computer-readable instructions further cause the system to facilitate toggling of a label enforcement functionality between an on setting and an off setting, wherein the label enforcement functionality generates instructions for a label enforcer of the application.

15. The system of claim 14, wherein the instructions cause the label enforcer to expose a notification that indicates when a file management action corresponding to the file management label becomes applicable to the data file.

16. The system of claim 8, wherein the computer-readable instructions further cause the system to update, in response to the selection data, metadata associated with the data file to indicate an aspect of the file management label.

17. A computer-implemented method, comprising:
obtaining an indication of a determination to associate a file management label with a data file, wherein content of the data file is at least partially defined by a stream, that is stored in a first storage location, that is an object of an object class associated with an operating system;
in response to the indication, causing an application, that is executing on the operating system, to perform a save operation that updates the stream to include label data that defines an aspect of the file management label;
receiving an instruction to communicate the data file from the first storage location to a second storage location; and
transmitting, in response to the instruction, the stream from the first storage location to the second storage location, wherein the label data that defines the aspect of the file management label persists within the stream of the data file at the second storage location.

18. The computer-implemented method of claim 17, further comprising updating, in response to the indication, metadata associated with the data file to indicate the aspect of the file management label.

19. The computer-implemented method of claim 17, wherein updating the stream to include the label data includes writing application criteria corresponding to the file management label into the stream that defines the content of the data file.

20. The computer-implemented method of claim 17, wherein updating the stream to include the label data includes writing an action identifier, that indicates a file management action corresponding to the file management label, into the stream that defines the content of the data file.

* * * * *